Figure 6:
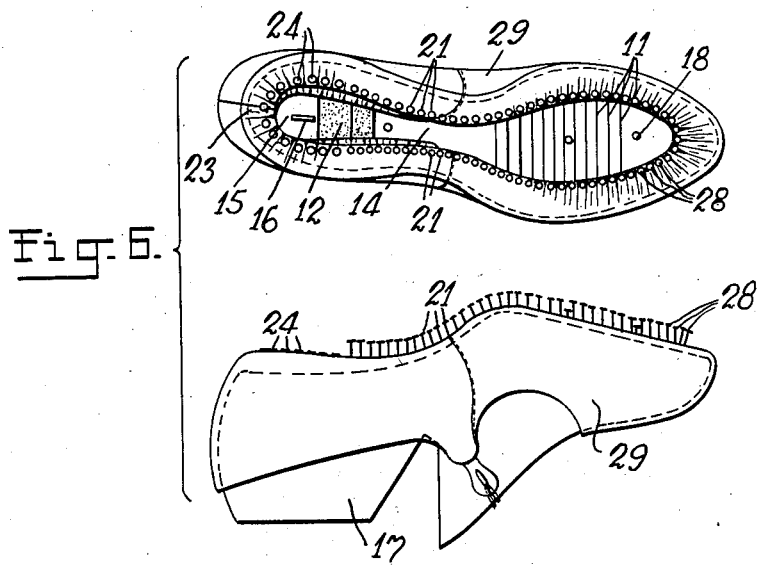

Jan. 22, 1935. W. H. BRESNAHAN 1,988,436
METHOD OF MANUFACTURING FOOTWEAR
Filed March 30, 1929 3 Sheets-Sheet 1
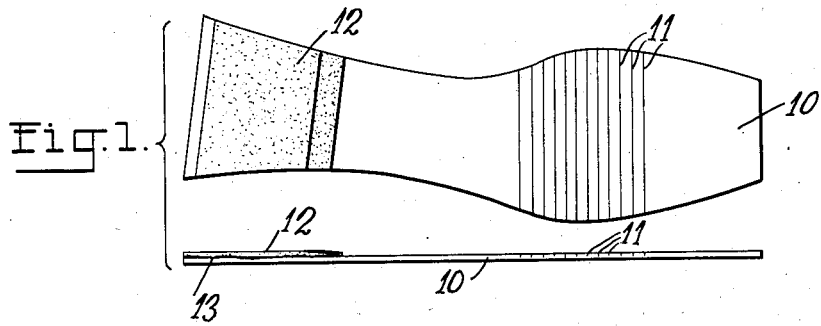
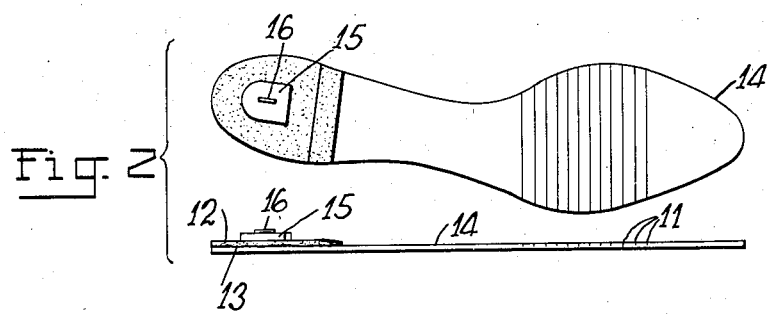
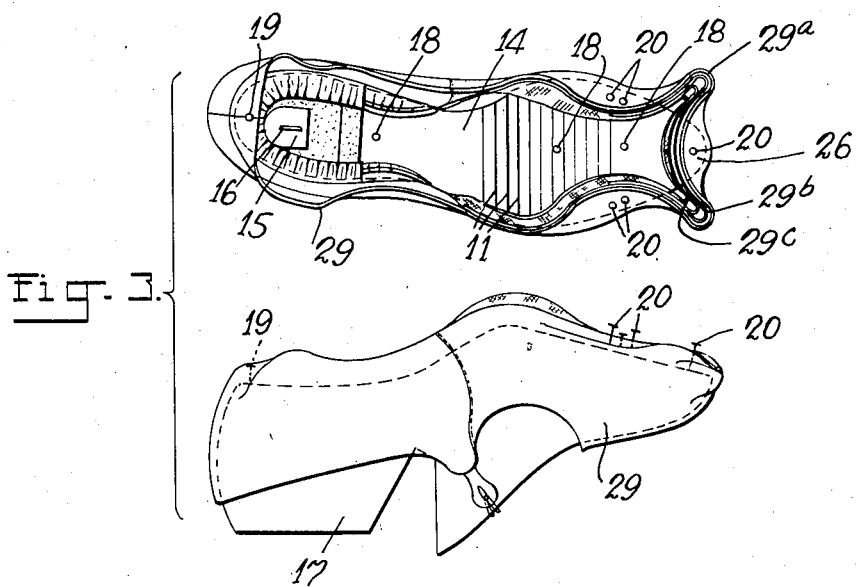
Inventor
William H. Bresnahan
By Attorney
Warfield + Watson Jan. 22, 1935.  W. H. BRESNAHAN  1,988,436
METHOD OF MANUFACTURING FOOTWEAR
Filed March 30, 1929  3 Sheets-Sheet 2
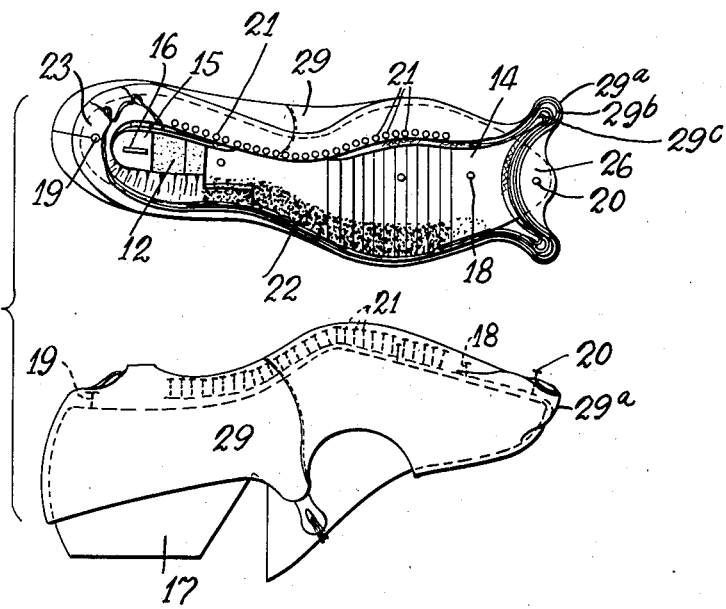
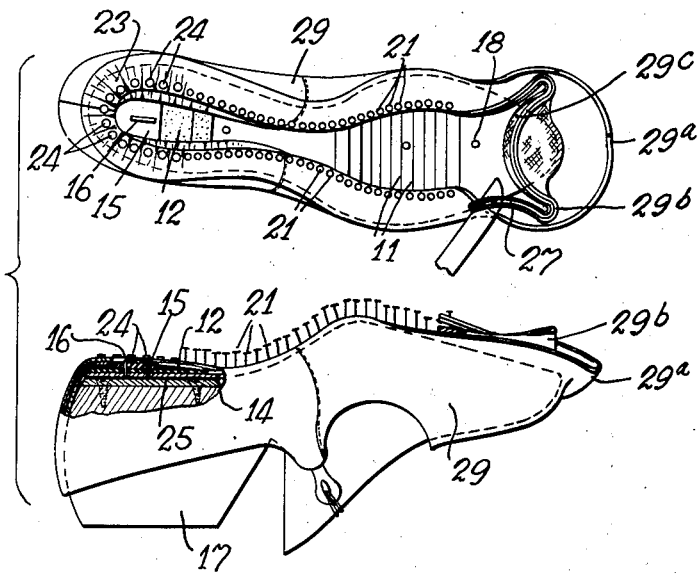

Jan. 22, 1935. W. H. BRESNAHAN 1,988,436
METHOD OF MANUFACTURING FOOTWEAR
Filed March 30, 1929 3 Sheets-Sheet 3

Inventor
William H. Bresnahan
By Warfield & Watson
Attorney

Patented Jan. 22, 1935

1,988,436

UNITED STATES PATENT OFFICE 1,988,436

METHOD OF MANUFACTURING FOOTWEAR

William H. Bresnahan, Lynn, Mass., assignor to Compo Shoe Machinery Corporation, New York, N. Y., a corporation of Delaware Application March 30, 1929, Serial No. 351,177

15 Claims. (Cl. 12—145)

This invention relates to improvements in methods of manufacturing footwear, and, more particularly, to an improved method of manufacturing lasted uppers in which the use of tacks, staples or stitches for firmly securing the upper to the inner sole is substantially eliminated.

A general object of this invention is to provide a method of making lasted uppers for shoes and the like by which a product of high quality can be readily and economically manufactured with an efficient utilization of time, labor and materials.

A more specific object of the invention is to provide a method of lasting shoes in which the upper is drawn into close conformity with the last without necessitating tempering or wetting, and the lasting allowance is securely, uniformly and permanently secured to the insole by an adhesive material and in a manner such as to avoid soiling, tearing, stretching or other mutilation of the shoe upper.

A further object is to provide a method of making a lasted shoe upper which is sturdy in construction but light and flexible in feel and appearance, and which is adapted to be used in the manufacture of shoes giving a maximum of comfort to the foot.

The principles of the present invention are applicable generally to footwear. For simplicity of illustration and description, the drawings and specification of the present application will be confined to a preferred method of making lasted uppers to be suitable for use in the manufacture of women's shoes. It is therefore to be understood that the word "shoes" as used in the specification and subjoined claims is intended, whenever the context permits, to include other types of footwear, such as, for example, men's and children's shoes, boots, lounging slippers and the like.

For a fuller understanding of the nature and objects of the invention reference should be had to the following detailed description taken in connection with the accompanying drawings, in which:

Figures 1 and 2 are each detail, composite plan and side elevational views in projection showing steps in the preparation of the inner sole; and Figs. 3 to 7 inclusive are similar detail views showing steps of the lasting operations and of the preparation of the lasted upper for the reception of the outer sole; certain portions of certain of the figures being shown partly broken away and in section, as indicated by the dot-dash line in certain figures.

The present invention necessitates no change in the operations of assembling the shoe uppers, which latter ordinarily consist of an outside layer of leather or fabric and one or more inner layers of fabric or other material, such as backing cloth, fiber and/or leather, which serve as a lining and give body and shape to the shoe. The present invention, however, does contemplate a series of selected and correlated steps pertaining to the stock fitting and lasting operations, as exemplified in the drawings and described hereinafter.

Referring more particularly to the drawings, Fig. 1 illustrates an inner sole blank 10, which is first slashed on the bottom side of the ball-portion by a plurality of cuts 11, and to which, at the heel-portion, is then affixed a rigid plate 12, such as fiber, as by glue 13 or the like.

As shown in Fig. 2 the inner sole 14 is next stamped out of the blank 10, and a small fiber piece 15 is secured over the fiber plate 12 and at approximately the center of the heel seat, as by means of a staple 16. This completes the preparation of the inner sole.

The lasting operations are exemplified in Figs. 3 to 6 inclusive of the drawings. As is shown in Fig. 3, the inner sole 14 is positioned on a last 17 in any suitable manner, such as by means of assembly tacks 18, and the assembled upper 29 is then placed on the last and secured in position on the inner sole, as by means of a tack 19 at the heel seat. The upper is next pulled over and the lasting allowance is temporarily secured in place at the front and sides of the toe, for example, by means of pull-over tacks 20 which are driven only part way in.

The shoe is next subjected to the operation of side lasting, as shown in Fig. 4, at which time a suitable adhesive cement, such as a relatively quick-drying pyroxylin cement, is applied to the side margin of the bottom of the inner sole and to the side faces of the lasting allowance of the outside 29a, the vamp lining 29b, and the doubler 29c, whereupon the lasting allowance is pulled over and secured in place by suitable means, such as the tacks 21, which are likewise driven only part way in. To insure proper lasting and cementing, and to avoid soiling and other mutilation of the upper, the side-lasting operation is carried on in two or more stages, namely, the pull-over tacks 20 are removed on one side, and adhesive is applied to at least a portion of this side, as at 22 in Fig. 4, whereupon the lasting allowance is pulled over and the tacks 21 are driven in on that side, and then the other portions are similarly treated.

The heel and toe portions of the shoe are then lasted, as shown in Figs. 5 and 6. This is preferably accomplished on a bed-lasting machine, the mechanically-operated jaws of which draw the lasting allowance over and hold it while it is secured in position. The heel-portion 23 may be lasted by driving tacks 24 all the way in, and, as is shown in section, the last is provided with an iron heel-plate 25, which clinches these tacks and the positioning tack 19 as they are driven. The use of a last having an iron bottom or plate at other than the heel-portion is unnecessary, since tacks at the heel seat are the only ones which are permanently driven into the shoe, and the shoe is in this sense substantially tackless.

The toe-portion 26 is lasted by withdrawing the pull-over tack 20 at the toe, wiping over the lasting allowance of the upper, then laying back the outside layer, and cutting away the inside layers of the lasting allowance comprising the vamp lining and doubler, as shown at 27, whereupon cement is applied to the inner sole and the inside of the remaining layer, and it is wiped over and tacked in position by driving the tacks 28 part way in.

Although in the above description of the lasting operation partly-driven tacks have been referred to as exemplifying a method of holding the lasting allowance in position while the cement is drying, it is to be understood that any suitable means can be used for this purpose providing that such means can be removed after the adhesive cement has set or will not interfere with the subsequent operations to be carried out on the lasted upper. When tacks or other nail-like fastening means are used, they should be preferably placed closely together, as, for example, at about one-fourth inch apart.

Figure 7:
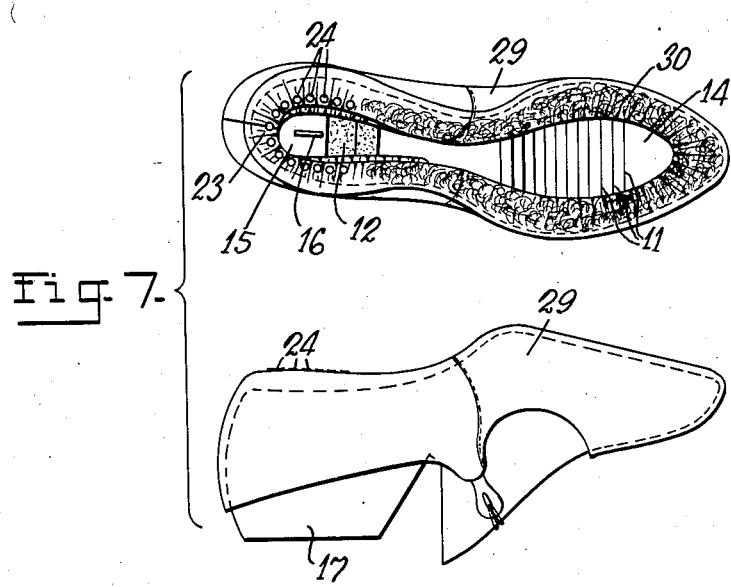

As shown in Fig. 7, after sufficient time has been allowed for the cement to dry, the assembly tacks 18 and all of the partly-driven tacks 21 and 28 are removed, leaving the upper attached to the inner sole at all portions except the heel-seat only by means of adhesive cement, whereupon it may be roughened marginally as at 30, and is ready for cementing and attaching to the outer sole. While reference has been made above to the use of permanent lasting tacks in the heel-seat of the lasted upper, it is to be understood that, if desired, said tacks can likewise be but partly driven in, and the lasting allowance cemented at this portion in a manner similar to that of the side and toe-lasting operations, whereby the lasted upper produced is entirely free of tacks or the like.

In the present method any suitable adhesive cement can be used, it being desirable, however, that the adhesive shall dry under the conditions of the lasting operations in a period of from 30 minutes to one hour after application, that it shall form a firm and water-proof, though flexible, union between the inner sole and the lasting allowance of the upper, and shall not tend to soften, shrink, curl or become brittle during shelf- or service-life conditions. For these purposes pyroxylin cement has been found to be particularly suitable.

It will thus be seen that in accordance with the principles of the present invention there has been provided a method of manufacturing lasted uppers by a process including a correlated series of operations by which a shoe upper formed of even the most delicate fabric or leather can be lasted to an inner sole quickly and efficiently and without soiling the fabric, and since certain changes may be made in carrying out the above method without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which as a matter of language might be said to fall therebetween.

Having described my invention, what I claim as new and desire to secure by Letters Patent is:

1. A method of lasting a shoe, including, in combination, positioning an inner sole on the bottom of a last, positioning an assembled plied upper around said last, lasting the side margins of the upper to the corresponding portions of the inner sole so as to leave an unlasted gap at the toe, removing at least one inner ply of the lasting allowance of the plied upper at the toe gap, and thereafter lasting an outer ply of lasting allowance material to the toe portion of the inner sole by adhesive.

2. A method of lasting a shoe, including, in combination, positioning an inner sole on the bottom of a last, positioning an assembled plied upper around said last, cement lasting the side marginal portions of the upper to the corresponding portions of the inner sole, temporarily fastening these portions in lasted position to allow the cement to set, removing the inner plies of material of the lasting allowance of the plied upper at the toe, cement lasting the remaining outermost ply or plies of lasting allowance material at the toe to the toe portion of the inner sole, temporarily fastening these toe parts in lasted position to allow the cement to set, and, after the cement sets, removing said temporary fastenings.

3. A method of lasting a shoe which includes lasting the side margins of a plied upper to the corresponding portions of an inner sole so as to leave an unlasted gap at the toe, then cutting away all save the outermost upper ply from the lasting allowance at the entire toe portion of the upper, applying cement between such outermost ply and the toe of the inner sole, wiping said ply into adhesive contact with the toe of the inner sole, and applying means to said ply for holding it in such position until the cement sets.

4. A method of lasting a shoe, including, in combination, positioning an inner sole on the bottom of a last, positioning an assembled plied upper around said last, applying adhesive to a portion of one of the side margins of the inner sole and to the lasting allowance and between the margins of the plies of the corresponding portion of the upper, lasting this portion while forcing the cemented lasting allowance into contact with the cemented portion of the inner sole, driving nail-like means part way in along the said lasting allowance to hold it in such position until the adhesive has set, and thereafter sequentially repeating said operations first on the other portions of the sides of the shoe, thereafter lasting the toe portion after removing all save the outermost upper plies from the lasting allowance of such toe portion, and, after the adhesive has set on both sides and the toe, removing the nail-like holding means.

5. A method of lasting a shoe, including, in combination, positioning an inner sole on the bottom of a last, positioning an assembled upper over said last, said assembled upper including an outside layer, vamp lining and doubler; lasting the sides by applying adhesive to one of the side margins of the inner sole and to the lasting allowance of the corresponding side of the assembled upper; lasting this side while forcing the cemented lasting allowances toward and into contact with the cemented margin of the inner sole; applying to said lasting allowance means to maintain it in such position until the adhesive has set, then sequentially repeating said operations on the other side of the shoe; and thereafter lasting the toe by wiping over the lasting allowance thereof, laying back the outside layer, cutting away the lasting allowance of the vamp lining and doubler, applying cement to the end margin of the inner sole and to the lasting allowance of the outside layer, wiping said lasting allowance over said cemented portion of the inner sole, and applying to said last-mentioned lasting allowance means to maintain it in such position until the adhesive has set.

6. A method of lasting a shoe, including, in combination, positioning an inner sole on the bottom of a last; positioning an assembled upper over said last and securing it by an assembly tack at the heel; said assembled upper including an outside layer, vamp lining and doubler; pulling over said assembled upper and securing it in place by driving a few nail-like pull-over tacks part way in through the lasting allowance at the toe-portion; lasting the sides by removing the pull-over tacks on one side; applying adhesive to the corresponding side margins of the inner sole and to the lasting allowance of the corresponding side of the assembled upper; lasting this side while forcing the cemented lasting allowances toward and into contact with the cemented margin of the inner sole; driving tacks part way in and through said lasting allowance to maintain it in such position until the adhesive has set, then sequentially repeating said operations on the other side of the shoe; thereafter lasting the toe by removing the pull-over tack at the toe, wiping over the lasting allowance of the toe, laying back the outside layer, cutting away the lasting allowance of the vamp lining and doubler, applying cement to the end margin of the inner sole and to the lasting allowance of the outside layer, wiping said lasting allowance over said cemented portion of the inner sole, driving tacks part way in and through said lasting allowance to maintain it in such position until the adhesive has set, and after the adhesive has set removing all of the partly-driven tacks.

7. A method of lasting a shoe, comprising, in combination, providing a last having an iron heel-plate; positioning an inner sole on the bottom of the last by an assembly tack through the fore part; positioning an assembled upper over said last and securing it by an assembly tack at the heel; said assembled upper including an outside layer, vamp lining and doubler; pulling over said assembled upper and securing it in place by driving a few nail-like pull-over tacks part way in through the lasting allowance at the toe-portion; lasting the sides by removing the pull-over tacks on one side; applying adhesive to the corresponding side margins of the inner sole and to the lasting allowance of the corresponding side of the assembled upper; lasting this side while forcing the cemented lasting allowances toward and into contact with the cemented margin of the inner sole; driving tacks part way in through said lasting allowance to maintain it in such position until the adhesive has set, then sequentially repeating said operations on the other side of the shoe; thereafter lasting the toe by removing the pull-over tack at the toe, wiping over the lasting allowance of the toe, laying back the outside layer, cutting away the lasting allowance of the vamp lining and doubler, applying cement to the end margin of the inner sole and to the lasting allowance of the outside layer, wiping said lasting allowance over said cemented portion of the inner sole, driving tacks part way in and through said lasting allowance to maintain it in such position until the adhesive has set, finally lasting the heel by wiping over the lasting allowance thereof and driving permanent tacks therefrom onto said iron heel-plate; and after the adhesive has set removing all of the partly-driven tacks.

8. A method of making a lasted shoe upper, which comprises, in combination, slashing an inner sole across the ball-portion of its bottom; providing a last having an iron heel-plate; positioning an inner sole on the bottom of the last by an assembly tack through the fore part; positioning an assembled upper over said last and securing it by an assembly tack at the heel; said assembled upper including an outside layer, vamp lining and doubler; pulling over said assembled upper and securing it in place by driving a few nail-like pull-over tacks part way in through the lasting allowance at the toe-portion; lasting the sides by removing the pull-over tacks on one side; applying adhesive to the corresponding side margins of the inner sole and to the lasting allowance of the corresponding side of the assembled upper; lasting this side while forcing the cemented lasting allowances toward and into contact with the cemented margin of the inner sole; driving tacks part way in and through said lasting allowance to maintain it in such position until the adhesive has set, then sequentially repeating said operations on the other side of the shoe; thereafter lasting the toe by removing the pull-over tack at the toe, wiping over the lasting allowance of the toe, laying back the outside layer, cutting away the lasting allowance of the vamp lining and doubler, applying cement to the end margin of the inner sole and to the lasting allowance of the outside layer, wiping said lasting allowance over said cemented portion of the inner sole, driving tacks part way in and through said lasting allowance to maintain it in such position until the adhesive has set, finally lasting the heel by wiping over the lasting allowance thereof and driving permanent tacks therefrom onto said iron heel-plate; and after the adhesive has set removing all of the partly-driven tacks.

9. A method of making a lasted shoe upper, which comprises, in combination, securing a layer of fiber on the bottom of the heel-portion of an inner sole blank; slashing said blank across the ball-portion of the bottom thereof; shaping an inner sole from said blank; providing a last having an iron heel-plate; positioning an inner sole on the bottom of the last by an assembly tack through the fore part; positioning an assembled upper over said last and securing it by an assembly tack at the heel; said assembled upper including an outside layer, vamp lining and doubler; pulling over said assembled upper and securing it in place by driving a few nail-like pull-over tacks part way in through the lasting allowance at the toe-portion; lasting the sides by removing the pull-over tacks on one side; applying adhesive to the corresponding side margins of the inner sole and to the lasting allowance of the corresponding side of the assembled upper; lasting this side while forcing the cemented lasting allowances toward and into contact with the cemented margin of the inner sole; driving tacks part way in and through said lasting allowance to maintain it in such position until the adhesive has set, then sequentially repeating said operations on the other side of the shoe; thereafter lasting the toe by removing the pull-over tack at the toe, wiping over the lasting allowance of the toe, laying back the outside layer, cutting away the lasting allowance of the vamp lining and doubler, applying cement to the end margin of the inner sole and to the lasting allowance of the outside layer, wiping said lasting allowance over said cemented portion of the inner sole, driving tacks part way in and through said lasting allowance to maintain it in such position until the adhesive has set, finally lasting the heel by wiping over the lasting allowance thereof and driving permanent tacks therefrom onto said iron heel-plate; and after the adhesive has set removing all of the partly-driven tacks.

10. A method of lasting a shoe, including in combination, positioning an inner sole on the bottom of a last, positioning an assembled upper over said last, said upper including an outside layer, vamp lining and doubler; lasting the sides by rendering adhesive the side margins of the inner sole and the side lasting allowance of the upper, lasting these adhesive parts while forcing the cemented lasting allowances toward and into contact with the adhesive side margins of the inner sole, applying to said side lasting allowances means to maintain them in such position until the adhesive has set; and thereafter lasting the toe by wiping over the lasting allowance thereof, laying back the outside layer, cutting away the lasting allowance of the vamp lining and doubler, rendering adhesive the end margin of the inner sole and the lasting allowance of the outside layer, wiping said lasting allowance over said adhesive portion of the inner sole, and applying to said last-mentioned allowance means to maintain it in such position until the adhesive has set.

11. A method of lasting a shoe comprising, in combination, side-lasting a plied upper to an inner sole so as to leave an unlasted gap at the toe, placing the shoe in a bed-lasting machine, wiping over the lasting allowance of the upper at the toe, retracting the wipers sufficiently to lay back an outer ply, lifting such ply, removing the inner layer or layers, wiping over said remaining outer ply, and lasting it to the inner sole by adhesive.

12. A method of toe lasting a shoe having a plied upper comprising, in combination, placing it in a bed-lasting machine with the toe in unlasted condition, wiping over the lasting allowance of the upper at the toe, retracting the wipers sufficiently to lay back an outer ply, lifting such ply and removing the inner layer or layers at the toe, rendering the opposed parts of said outer ply and said inner sole adhesive, wiping over said ply, and holding it in position until the adhesive holds the parts in place.

13. A method of lasting a shoe including, in combination, side-lasting a plied upper to an inner sole so as to leave an unlasted gap at the toe, placing the shoe in a bed-lasting machine, wiping over the lasting allowance of the upper at the toe, then laying back the outside layer and cutting away the inside layers, applying adhesive between the inner sole and the remaining layer, wiping over said layer, and holding it in position until the adhesive sets sufficiently to hold the parts in place.

14. A method of lasting a shoe including, in combination, side-lasting a plied upper to an inner sole so as to leave an unlasted gap at the toe, placing the shoe in a bed-lasting machine, wiping over the lasting allowance of the upper at the toe, retracting the wipers sufficiently to lay back an outer ply, lifting such ply and removing an inner layer or layers, rendering the opposed parts of said outer ply and said inner sole adhesive, wiping over said ply and holding it in position until the adhesive holds the parts in place.

15. A method of lasting a shoe comprising, in combination, placing an inner sole on a last, pulling a plied upper over said last and holding it in position by means of temporary pull-over tacks at the sides and toe, side-lasting the upper to the inner sole so as to leave an unlasted gap at the toe, placing the shoe in a bed-lasting machine, withdrawing the pull-over tack at the toe, wiping over the lasting allowance of the upper at the toe, retracting the wipers sufficiently to lay back an outer ply, lifting such ply and removing the inner layer or layers, wiping over the remaining outer ply, and lasting it to the inner sole by rendering the opposed surfaces of such parts adhesive, and holding them together until the adhesive is able to hold the parts in place.

WILLIAM H. BRESNAHAN.